US008119001B2

(12) United States Patent
Stemmer et al.

(10) Patent No.: US 8,119,001 B2
(45) Date of Patent: Feb. 21, 2012

(54) EXCHANGEABLE OIL FILTER WITH SPRING-OPERATED PIN FOR DRAINAGE

(75) Inventors: Xaver Stemmer, Reichertshofen (DE); Michael Jung, Hitzhofen (DE); Jürgen Albert Holl, Ingolstadt (DE); Stefan Barte, Ingolstadt (DE)

(73) Assignee: Audi AG, Ingolstadt (DE)

( * ) Notice: Subject to any disclaimer, the term of this patent is extended or adjusted under 35 U.S.C. 154(b) by 793 days.

(21) Appl. No.: 12/095,896

(22) PCT Filed: Nov. 29, 2006

(86) PCT No.: PCT/EP2006/011450
§ 371 (c)(1),
(2), (4) Date: Oct. 20, 2008

(87) PCT Pub. No.: WO2007/062821
PCT Pub. Date: Jun. 7, 2007

(65) Prior Publication Data
US 2009/0078629 A1    Mar. 26, 2009

(30) Foreign Application Priority Data
Dec. 2, 2005   (DE) .......................... 10 2005 057 710

(51) Int. Cl.
*B01D 35/153*   (2006.01)
*B01D 21/24*    (2006.01)
(52) U.S. Cl. .................. 210/234; 210/167.32; 210/235; 210/433.1
(58) Field of Classification Search .......................... None
See application file for complete search history.

(56) References Cited

U.S. PATENT DOCUMENTS
6,811,694 B2 *  11/2004  Jainek ........................... 210/248

FOREIGN PATENT DOCUMENTS
| CN | 1073455 C | 10/2001 |
| DE | 33 44 568 A1 | 6/1985 |
| DE | 3344568 A1 | 6/1985 |
| DE | 34 32 855 A1 | 3/1986 |

(Continued)

OTHER PUBLICATIONS

Office Action dated Sep. 18, 2009 issued in a related Chinese patent application No. CN 200680038197.1.

(Continued)

*Primary Examiner* — Krishnan S Menon
*Assistant Examiner* — Allison M Gionta
(74) *Attorney, Agent, or Firm* — Novak Druce + Quigg LLP

(57) ABSTRACT

The invention relates to a device for filtering of oil circulating in an internal combustion engine, comprising an oil filter adapter for detachable fastening of an exchangeable oil filter to the engine block of the internal combustion engine. The invention is characterized in that the oil filter adapter has a receptacle with an inserted pin, the receptacle having an outflow for returning the oil flowing from the exchangeable oil filter, the receptacle having a channel which leads in particular to an oil pump, and the receptacle having a drain which leads in particular to the cylinder crankcase, the pin being inserted elastically pretensioned such that during operation the pin clears the outflow and closes the channel and the drain, and, when the exchangeable oil filter is loosened from the oil filter adapter, the pin is displaced by spring force and clears the outflow, the channel, and the drain. Furthermore the invention includes a pin which is designed for use in the device according to the invention.

13 Claims, 2 Drawing Sheets

FOREIGN PATENT DOCUMENTS

| | | |
|---|---|---|
| DE | 3432855 A1 | 3/1986 |
| DE | 36 22 153 C1 | 8/1987 |
| DE | 3622153 C1 | 8/1997 |
| DE | 10038531 A1 | 2/2002 |
| EP | 839 563 A1 | 5/1998 |
| WO | WO 2004/087290 A | 10/2004 |
| WO | WO 2004087290 A1 | 10/2004 |

OTHER PUBLICATIONS

Office Action dated Jun. 26, 2009 issued in a related German patent application No. DE 10 2005 057 710.5-13.

Office Action dated Nov. 25, 2008 issued in a related European patent application No. EP 06 818 903.4.

\* cited by examiner

EXCHANGEABLE OIL FILTER WITH SPRING-OPERATED PIN FOR DRAINAGE

The invention relates to an oil filter.

BACKGROUND OF THE INVENTION

Internal combustion engines of motor vehicles have exchangeable oil filters for cleaning the oil; they are connected to the internal combustion engine so that the oil from the internal combustion engine can circulate through the exchangeable oil filter and back again to the internal combustion engine. Exchangeable oil filters such as these, for example, have a filter insert which can be completely incinerated and are generally changed or replaced at fixed intervals together with the oil of the internal combustion engine. For this purpose the exchangeable oil filter has a thread for simple replacement, with which it can be inserted and screwed tightly into a corresponding opening of the oil filter adapter on the engine block of the internal combustion engine. In addition, seals for improving the seal before installing the exchangeable oil filter are used. Furthermore, exchangeable oil filters are known from the prior art which have a drainage pin.

But the disadvantage is that residual oil remains in the engine when the exchangeable oil filter is replaced.

Therefore the object of the invention is to make available a device in which residual oil does not remain in the engine when the exchangeable oil filter is replaced.

SUMMARY OF THE INVENTION

The invention is based on the elastically pretensioned pin acting as a valve which during operation, that is, when oil is circulating, holds an outflow open through which cleaned oil coming from the exchangeable oil filter is returned again to the engine, while a channel which leads in particular to the oil pump and a drain which leads to the crankcase are closed. If, however, the exchangeable oil filter is separated or removed from the oil filter adapter, the pin which acts as a valve automatically opens the channel which leads to the oil pump and the drain which leads to the cylinder crankcase so that a first connection from the outflow to the drain and a second connection from the channel to the drain are cleared, so that the residual oil in the region of the outflow and in the region of the channel as well as within the pin can automatically run out, i.e., under the action of gravity.

BRIEF DESCRIPTION OF THE DRAWINGS

One embodiment of the invention is explained below using the drawings.

DETAILED DESCRIPTION OF THE PREFERRED EMBODIMENT OF THE INVENTION

Figure 1:
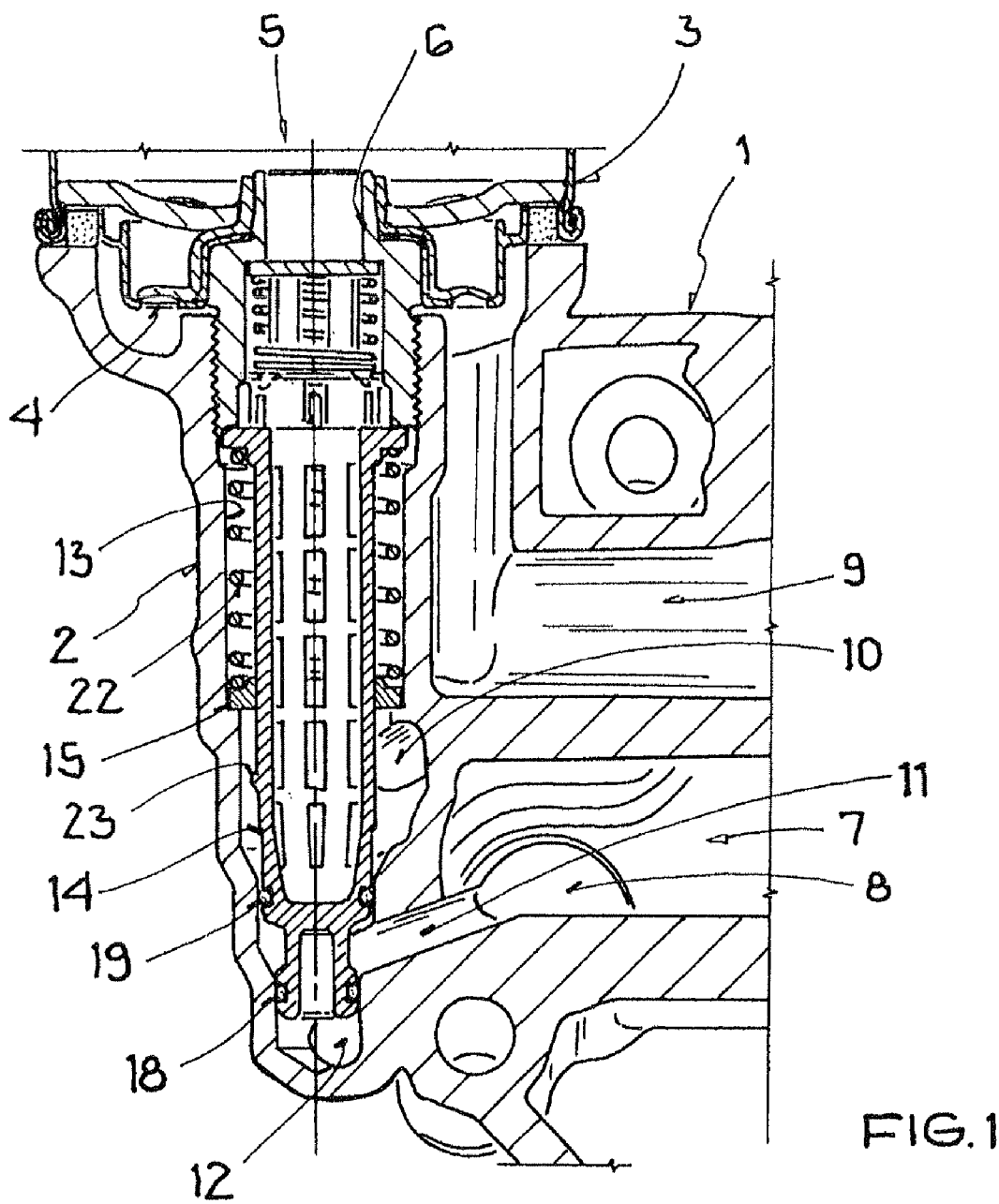
FIG. 1 shows in a sectional view an engine block with an oil filter holder into which a pin is inserted and to which an exchangeable oil filter is attached in its mounting position.

The engine block 1 of an internal combustion engine has an oil filter adapter 2 which can be mounted detachably or non-detachably on the engine block 1. Above the engine block 1 an exchangeable oil filter (shown in a section) is detachably mounted, for example, by means of a thread and, for example, has a filter insert (not shown) which can be completely incinerated. The exchangeable oil filter 3 has an inlet 4 and an outlet 5 which are both pointed down, the outlet 5 being located on a connecting piece which projects in the screw-in direction 6.

The engine block 1 furthermore has a first space 7 with an inflow 8 which establishes a connection to an oil pump (not shown) for the circulating oil. A second space 9 of the engine block 1 is located above the first space 7 and establishes a connection to the inlet 4 of the exchangeable oil filter 3 for the circulating oil.

The oil filter adapter 2 has a receptacle 13 which has an annularly made collar 15 on which a pin 14 which is inserted in the receptacle 13 rests. The receptacle 13 of the oil filter adapter 2 has an outflow 10 through which oil coming from the exchangeable oil filter 3 can be returned to the engine. Underneath the outflow 10 there is a channel 11 which can establish a connection from the receptacle 13 to the first space 7 of the engine block 1. Furthermore the receptacle 13 of the oil filter adapter 2 has a drain 12 which is located underneath the channel 11 and which can establish a connection to the cylinder crankcase (not shown).

The pin 14 in the receptacle 13 consists essentially of a base body of cylindrical shape and has a passage 16 which establishes a connection to the outlet 5 of the exchangeable oil filter 3 for the circulating oil. The passage 16 of the pin 14 is connected to a plurality of slot-like radial openings 17 so that oil from the outlet 5 of the exchangeable oil filter 3 can flow through the passage 16 and the radial openings 17 of the pin 14 to the outlet 10.

On its lower end (see FIG. 3) the pin 14 has a first seal 18 and a second seal 19, the first seal 18 of the pin 14 and the receptacle 13 being made such that in the mounting position shown in FIG. 1 the channel 11 is closed. Furthermore the second seal 19 and the receptacle 13 are made such that the drain 12 is closed in the mounting position shown in FIG. 1.

The pin 14 (see FIG. 3) on its upper end has a contact surface 20 and underneath it an annularly made bearing surface 21. Between the contact surface 20 and the bearing surface 21 of the pin 14 there is a helical spring which is dynamically connected to the contact surface 20 and the bearing surface 21 such that the helical spring 22 can be compressed by reducing the distance between the contact surface 20 and the bearing surface 21. The helical spring 22 can, for example, have a diameter of 23×2 mm. Instead of the helical spring 22, however, other suitable spring elements can also be used. Furthermore the pin 44 has three stop means 23 which are spaced uniformly on the periphery of the bearing surface 21, which are made in the shape of projections and in the positions shown in FIG. 3 adjoin the bearing surface 21 and prevent further release of the helical spring 22.

In the mounting position (see FIG. 1) the contact surface 20 is in contact with the connecting piece 6 of the exchangeable oil filter 3 while the annular bearing surface 21 engages the corresponding collar 15. In this mounting position the helical spring 22 is compressed so that the helical spring 22 is elastically pretensioned, for example, with 15 mm.

During operation, with the channel 11 closed and the drain 12 closed, the oil which is under a pressure $p_1$ flows out of the inflow 8, for example, coming from an oil pump, into the first space 7 from which the oil is routed, for example, through an oil cooler (not shown). Coming from the oil cooler the oil which is under a pressure $p_2$ flows into the second space 9, from which it is routed through the inlet 4 into the exchangeable oil filter 3. The oil leaving the exchangeable oil filter 3 through the outlet 5 is under a pressure $p_3$, $p_3 < p_2 < p_1$ applying to the ratio of the magnitudes of the pressures $p_1$ to $p_3$. From the outlet 5 of the exchangeable oil filter 3 the circulating oil flows down through the pin 14 with its passage 16 and the radial openings 17 into the outflow 10 and is then routed to the engine.

Figures 2, 3:
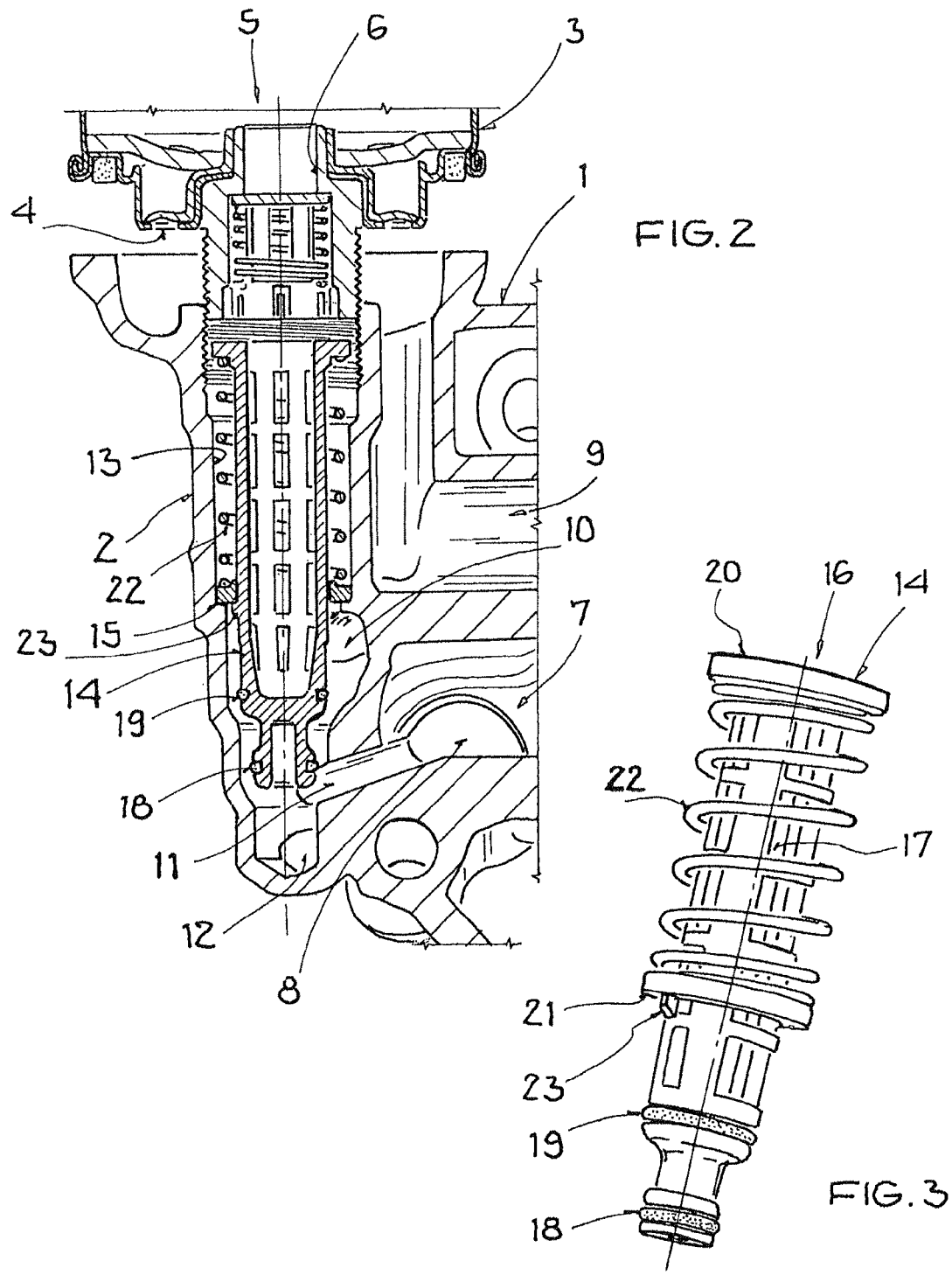
FIG. 2 shows in a sectional view an engine block with an oil filter holder into which a pin is inserted, in which in contrast to FIG. 1 an exchangeable oil filter has been loosened for replacement.
FIG. 3 shows a perspective view of a pin.

When the exchangeable oil filter 3 is loosened, for which, for example, several turns are necessary, the position of the exchangeable oil filter 3 shown in FIG. 2 is reached. In this position the helical spring 22 of the pin 14 is relieved so that in the unscrewing direction of the exchangeable oil filter 3 the pin 14 is automatically displaced axially.

As a result of this motion, the first seal 18 of the pin 1 no longer closes the channel 11 so that residual oil 11 which is located in the channel 11 and/or in the first space 7 can automatically travel to the drain 12 which is likewise opened by this motion. The second seal 19 as a result of this motion furthermore no longer closes the outflow 10 so that the residual oil which is located in the outflow 10 can likewise travel automatically past the opened first seal 18 to the drain 12. Furthermore, the residual oil which is located in the receptacle 13 or within the pin 14, for example, in the passage 16, can run out automatically through the drain 12 through which the residual oil can travel into the cylinder crankcase (not shown). When the residual oil has run out, the exchangeable oil filter 3 can be removed.

Finally, a new exchangeable oil filter 3 is mounted and screwed tight so that again the position shown in FIG. 1 is reached. The pin 1 is designed such that when the new exchangeable oil filter 3 is mounted, first roughly 2 turns of the thread engage and then, as turning continues, the face surface of the connecting piece 6 comes into contact with the pin 1 and then the pin 1 is displaced against the spring 22.

The invention claimed is:

1. A device for filtering of oil circulating in an internal combustion engine, comprising an oil filter adapter for detachable fastening of an exchangeable oil filter to the engine block of the internal combustion engine, wherein the oil filter adapter has a receptacle with an inserted pin, the receptacle having an outflow for returning the oil flowing from the exchangeable oil filter, the receptacle having a channel which leads to an oil pump, and the receptacle having a drain which leads to the cylinder crankcase, the pin being inserted biasingly pretensioned such that during operation the pin clears the outflow and closes the channel and the drain, and, when the exchangeable oil filter is loosened from the oil filter adapter, the pin is displaced by biasing force and clears the outflow, the channel and the drain.

2. The device according to claim 1 in that in the inserted state the pin can be axially displaced in the direction of the loosening motion when the exchangeable oil filter is loosened.

3. The device according to claim 1 wherein the biasing force is made available by a helical spring.

4. The device according to claim 1 wherein the pin has a bearing surface which is made for interaction with a connecting piece of the exchangeable oil filter.

5. The device according to claim 1 wherein the pin has a first seal which during operation is located between the channel and the drain and that the pin has a second seal which is located between the outflow and the channel during operation.

6. The device according to claim 1 wherein the outflow is located above the channel and that the channel is located above the drain.

7. The device according to claim 1 wherein with the outflow, channel and drain cleared the oil can essentially drain automatically.

8. A pin as defined in claim 1.

9. An oil drainage assembly for an internal combustion engine provided with an engine block, an oil filter detachably connected to said engine block and having an inlet and an outlet, a crankcase and an oil pump, comprising:

means comprising a portion of said engine block defining a compartment axially aligned with an outlet of said oil filter when said oil filter is attached to said engine block, having a first part communicable with components supported on said engine block, a second part communicable with said oil pump and a third part communicable with said crankcase;

a cylindrical member disposed in said compartment having an inlet port communicating with the outlet port of said oil filter when said oil filter is attached to said engine block and an outlet port, displaceable between a first, closed position when said oil filter is attached wherein said outlet port of said cylindrical member communicates with said first port of said engine block and intercommunication of said second and third ports of said engine block is precluded, and a second, open position when said oil filter is detached wherein said outlet port of said cylindrical member communicates with said first port of said engine block and said first and second ports of said engine block communicate with said third port of said engine block; and means interposed between said engine block and said cylindrical means for biasing said cylindrical member into said second, open position.

10. An assembly according to claim 9 wherein said engine block includes a passageway intercommunicating said out pump and an inlet of said oil filter when said oil filter is attached to said engine block.

11. An assembly according to claim 9 wherein said biasing means comprise a coil spring.

12. An assembly according to claim 9 including a first sealing ring disposed on said cylindrical member and engaging said engine block between said second and third ports of said compartment when said cylindrical member is in said first position and between said first and second parts of said compartment when said cylinder member is in said second position, and a second sealing ring disposed on said cylindrical member and engaging said engine block between said second and third parts of said compartment when said cylindrical member is in said first position and between said first and second parts of said compartment when said cylindrical member is in said second position.

13. An assembly according to claim 9 means for precluding displacement of said cylindrical member beyond said first and second position.

* * * * *